O. SLIGER.
RACK ASSEMBLING MACHINE.
APPLICATION FILED JUNE 11, 1920.

1,354,424.

Patented Sept. 28, 1920.
7 SHEETS—SHEET 1.

Inventor:
Oscar Sliger,
By Dodge and Sons,
his Attys.

O. SLIGER.
RACK ASSEMBLING MACHINE.
APPLICATION FILED JUNE 11, 1920.

1,354,424.

Patented Sept. 28, 1920.
7 SHEETS—SHEET 2.

Inventor:
Oscar Sliger,
By Dodge and Sons
his Attys.

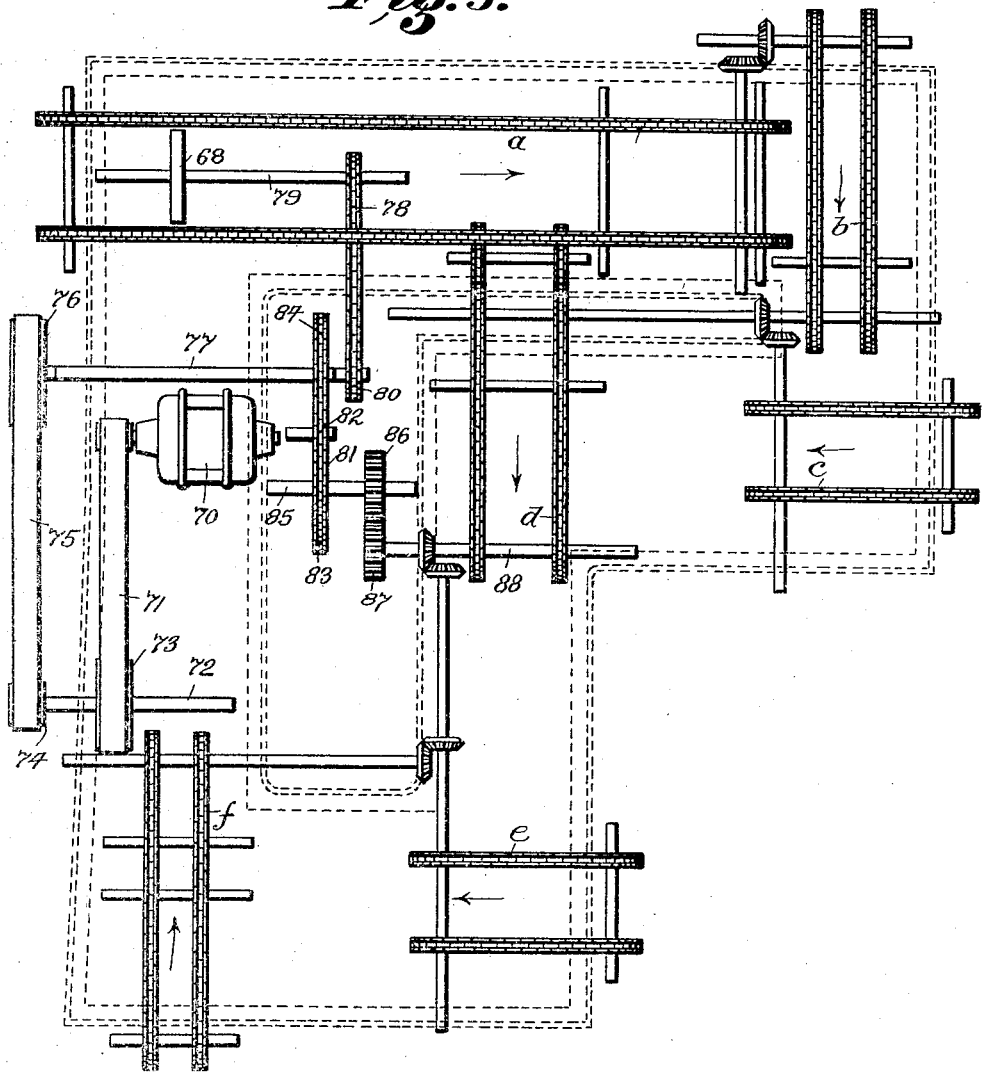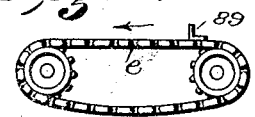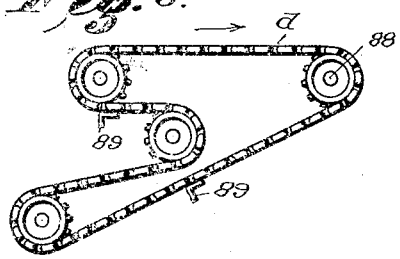

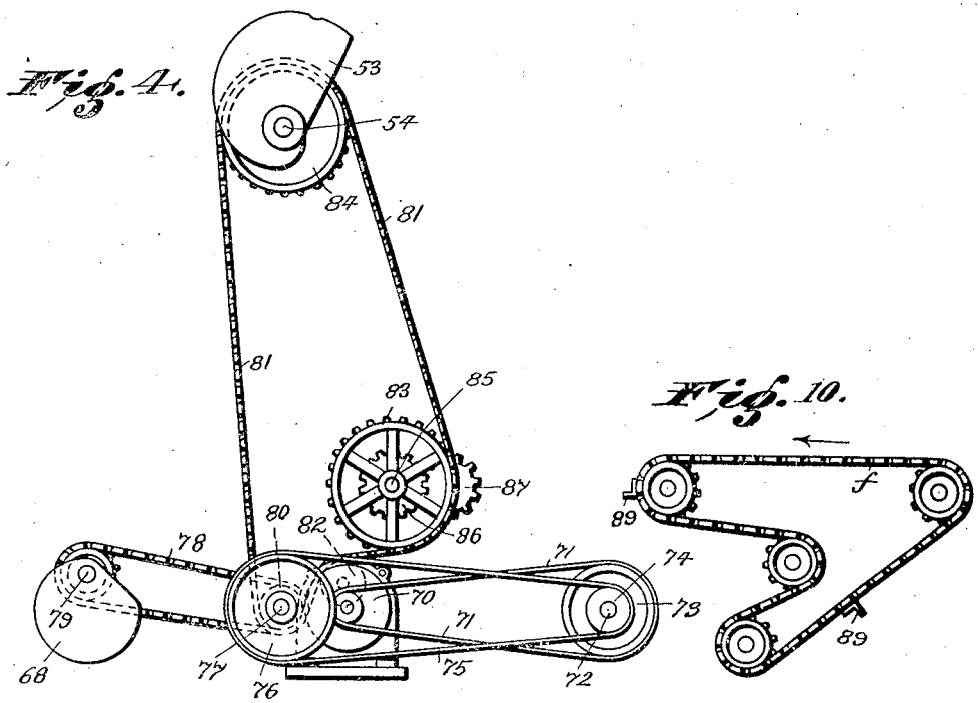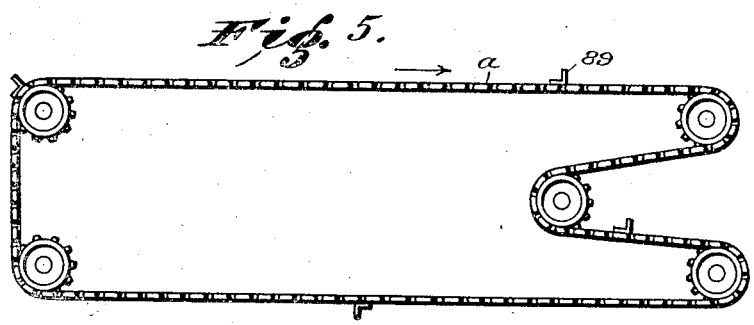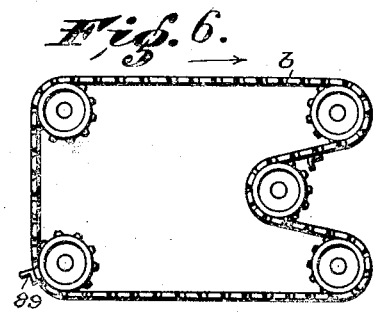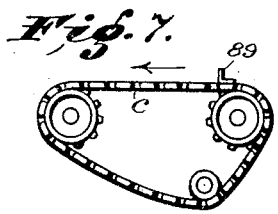

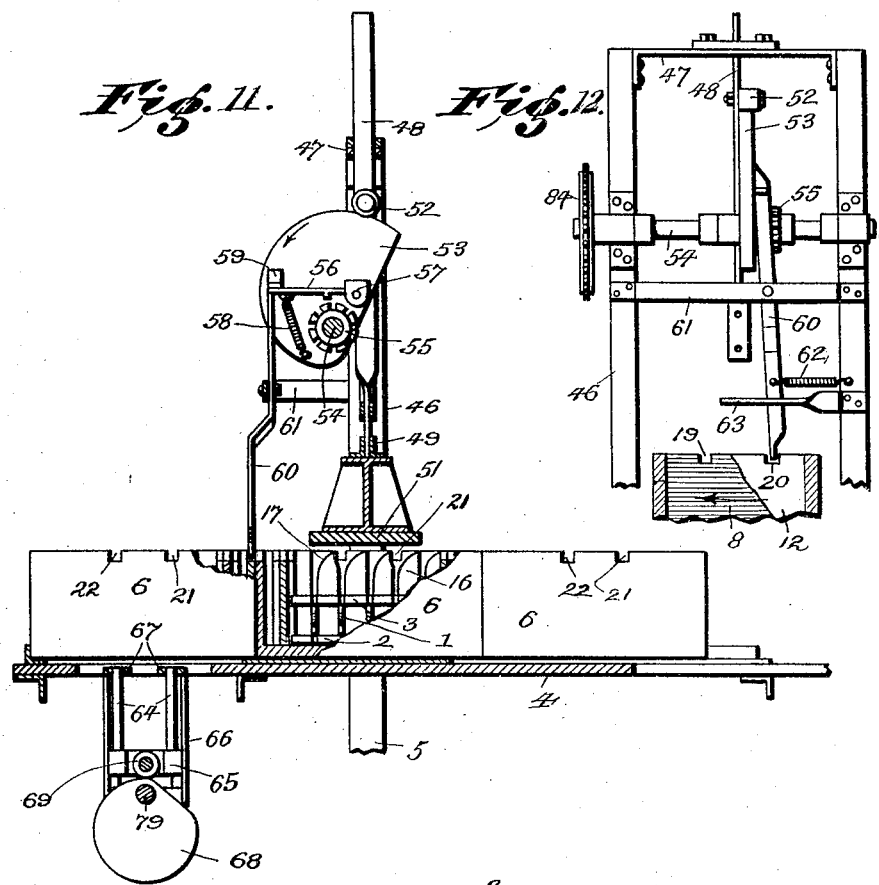
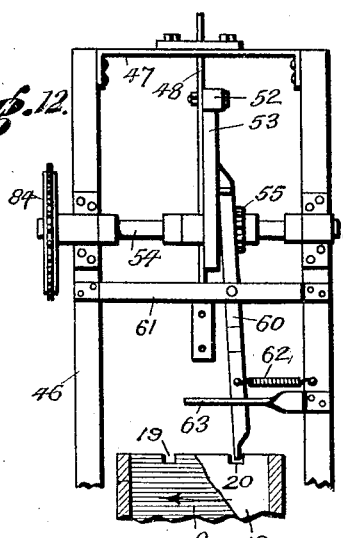
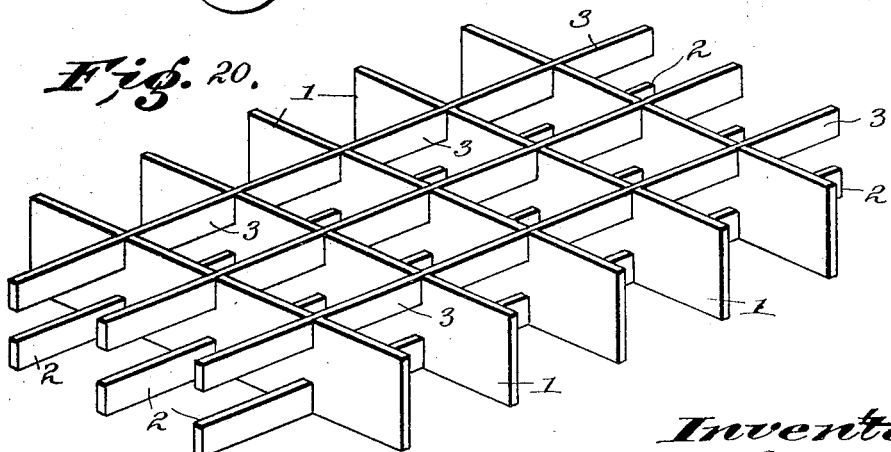

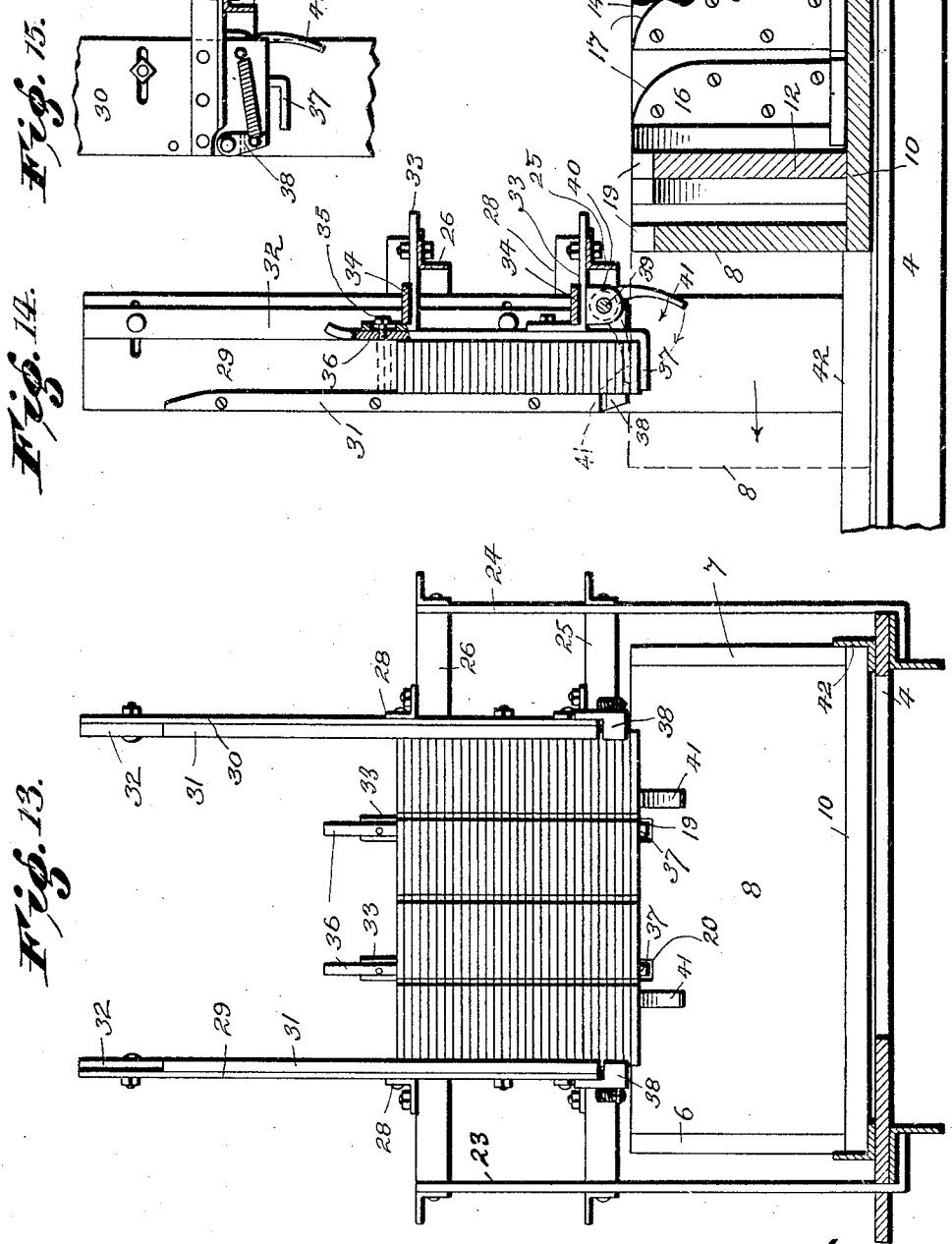

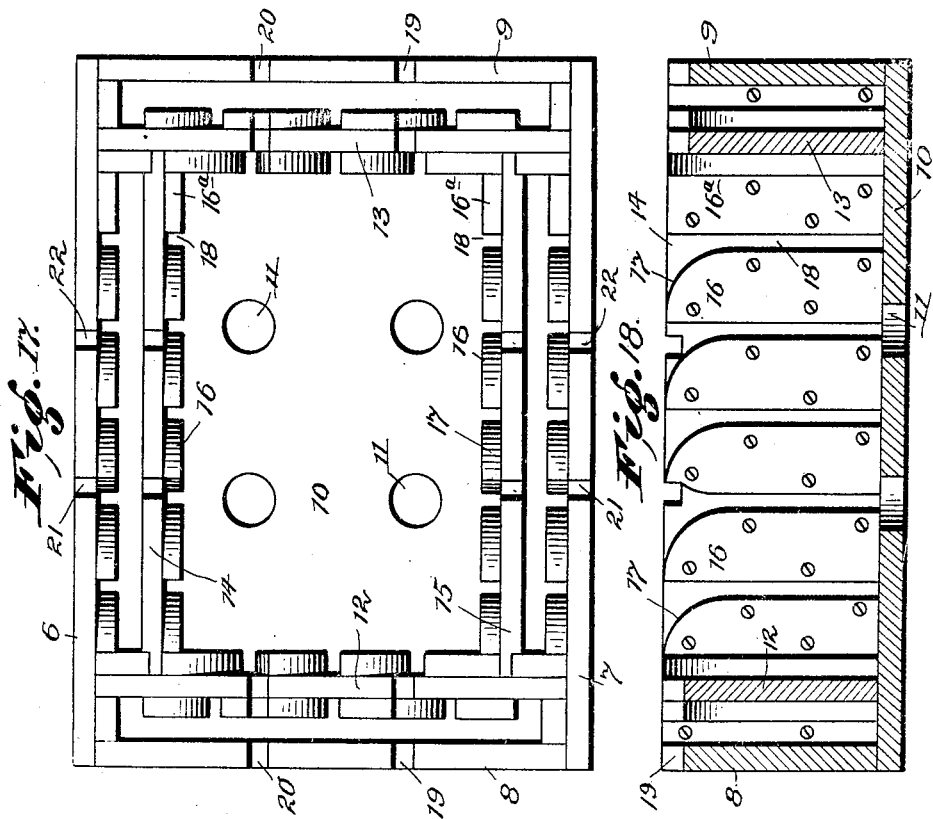

UNITED STATES PATENT OFFICE.

OSCAR SLIGER, OF LOUISVILLE, KENTUCKY, ASSIGNOR TO MENGEL BOX COMPANY, OF LOUISVILLE, KENTUCKY, A CORPORATION OF NEW JERSEY.

RACK-ASSEMBLING MACHINE.

1,354,424.  Specification of Letters Patent.  Patented Sept. 28, 1920.

Application filed June 11, 1920. Serial No. 388,358.

*To all whom it may concern:*

Be it known that I, OSCAR SLIGER, a citizen of the United States, residing at Louisville, in the county of Jefferson and State of Kentucky, have invented certain new and useful Improvements in Rack-Assembling Machines, of which the following is a specification.

This invention pertains to an improved rack assembling machine, and has for its main object the production of a machine wherein the various component elements of the rack will be automatically assembled and then forced into locking relation with each other.

The invention contemplates the use of a series of forms into each of which the rack elements are introduced in proper sequence and in proper relative position, means for thereafter forcing the elements together, and means for automatically ejecting the assembled racks from the forms. The invention also contemplates the use of a series of forms with means for automatically passing the same beneath hoppers which contain the rack blanks, and in so constructing the forms and hopper elements that the blanks will be automatically withdrawn and positioned within the forms.

A preferred embodiment of the invention is illustrated in the annexed drawings wherein,—

Figure 1:
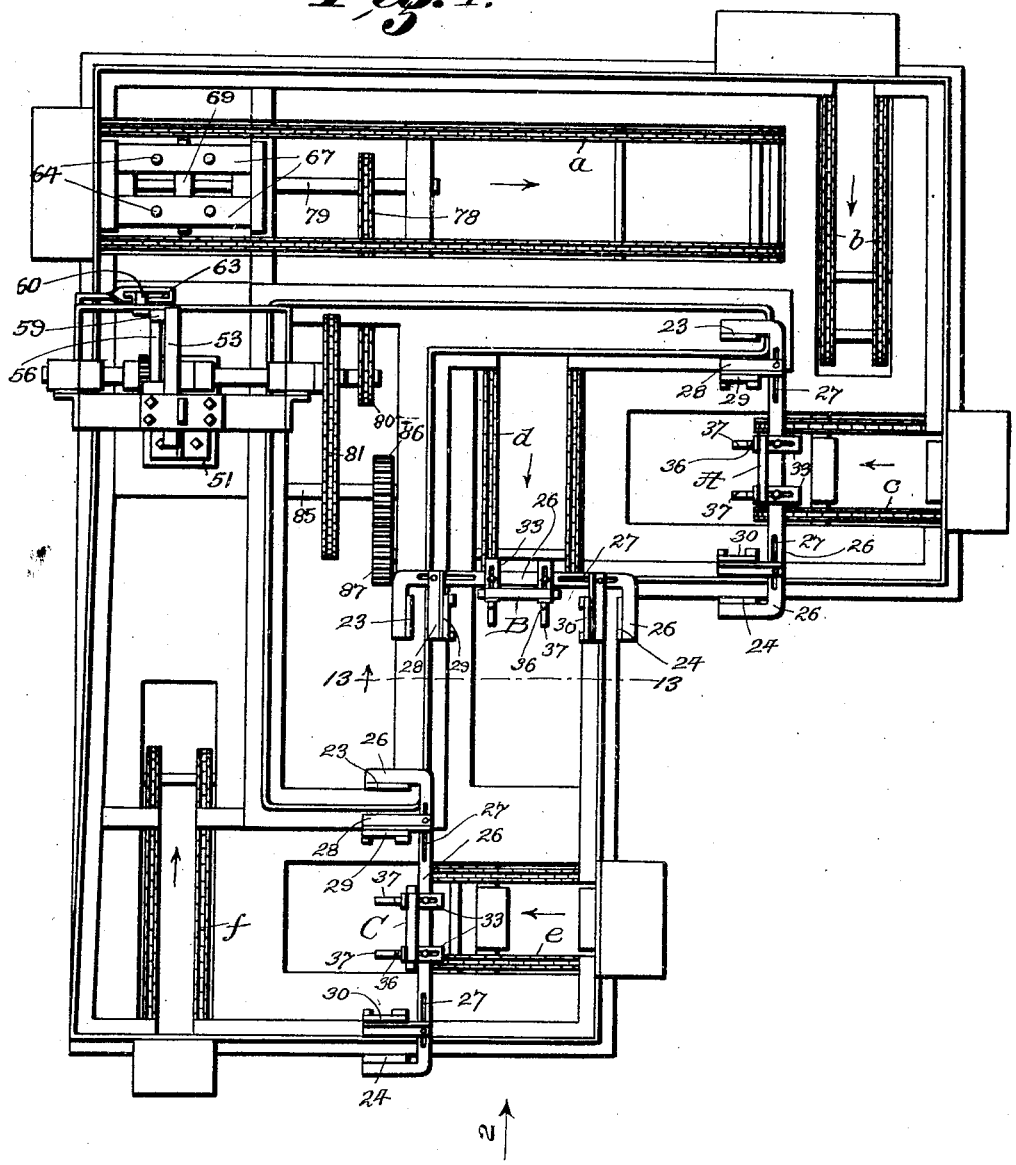
Figure 2:
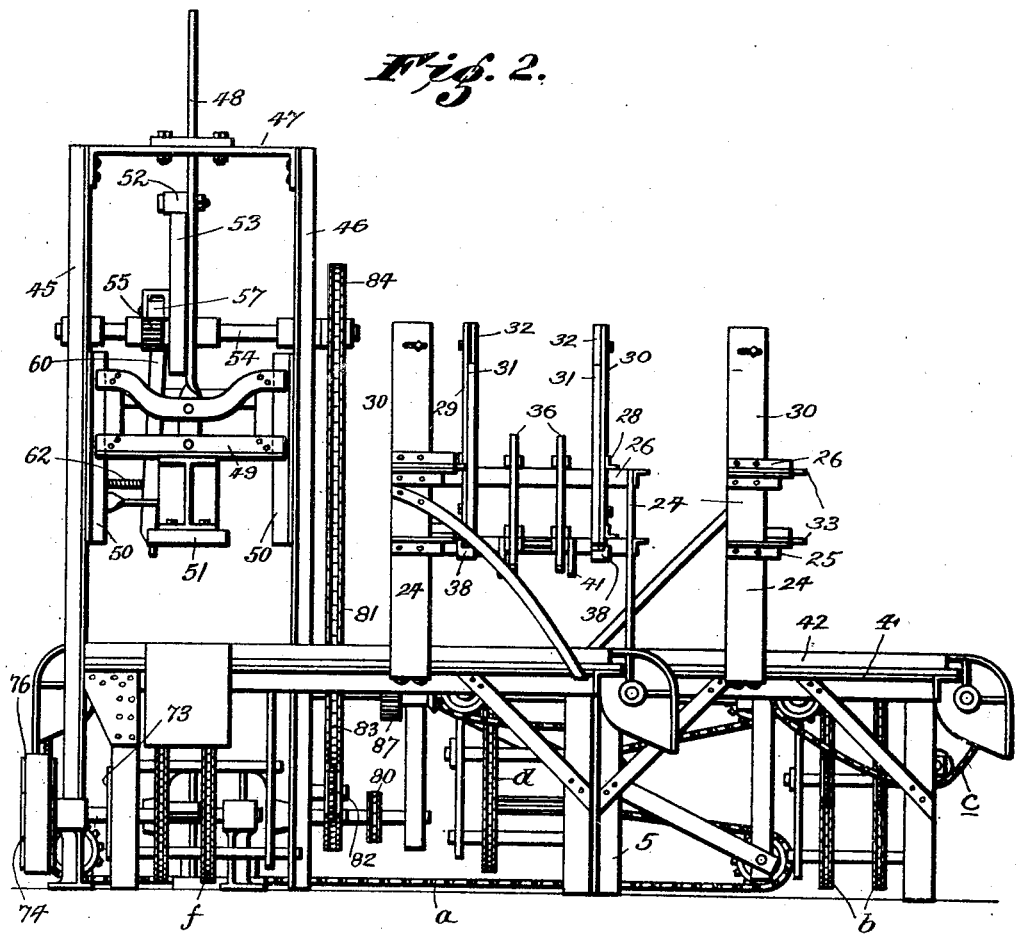
Figure 19:
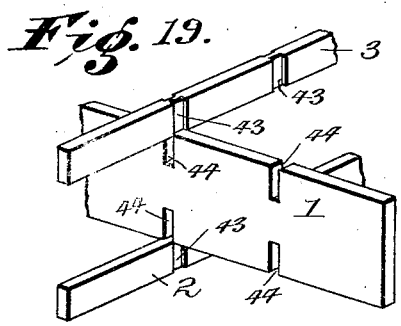

Figure 1 is a top plan view of the entire machine;

Fig. 2 an end elevation of the machine looking in the direction of the arrow 2 in Fig. 1;

Fig. 3 a top plan view of the several conveyers and showing the arrangement of the driving gears;

Fig. 4 a side elevation of that portion of the driving gearing which is directly associated with the motor;

Figs. 5, 6, 7, 8, 9 and 10 are, respectively, separate detailed views of the conveyers employed;

Figs. 11 and 12, detailed views of the mechanism controlling the vertical reciprocatory weight which drives the assembled rack members in the form into interlocked condition;

Fig. 13 an enlarged view substantially on the line 13—13 of Fig. 1 showing the hopper in front elevation;

Fig. 14 a vertical section through the hopper;

Fig. 15 a fragmentary view showing the details of the yieldable catches which are at the lower ends of the vertical guide plates of the hopper;

Fig. 16 a top plan view of one of the hoppers;

Figs. 17 and 18 detailed views of the form;

Fig. 19 a fragmentary view showing the relation of the rack members when they are deposited in the forms ready to be driven into interlocking engagement; and Fig. 20 a view of the completed rack.

In the present showing the machine is designed to assemble a rack of the form shown in Fig. 20, in which 1 are the cross partitions, 2 the lower series of slats and 3 the slats of the upper series. As will be apparent from the following description the rack may have a greater or less number of partitions and slats and the dimensions thereof may be varied, it being necessary only to change the forms as to size and arrangement to bring about such result. The various operative parts are carried by and upon a table 4 which is suitably supported by a plurality of legs 5. The partitions and slats are stacked in separate hoppers and are automatically withdrawn therefrom and positioned in the forms. Such forms, of which a plurality are employed, are alike in structure, and consequently a description of one will suffice.

Referring more particularly to Figs. 17 and 18, the form may be said to comprise two side elements 6 and 7, two ends 8 and 9, and a bottom 10, the latter being provided with openings 11 through which kicker or ejecting members, later to be described, may pass. Mounted within such box-like form are a series of vertically disposed walls or elements 12, 13, 14 and 15, and upon the innermost face of each is secured a series of vertically disposed spaced guide members or cleats 16. Said cleats are of a height equal to that of the partitions and the upper end of each, with the exception of the last of the series, denoted by $16^a$, are rounded off as at 17, whereby guideways 18 are formed for the ends of the cross partitions 1 and the slats 2 and 3 of the rack. The walls are made removable so that others having differently spaced guideways may be substituted or larger racks assembled. Thus the walls 12 and 13 are reversible and have cleats upon each face, those on one side being more widely spaced than those on the other. So, too, the sides 6 and 7, are provided with cleats forming guideways which may be utilized with longer blanks when the walls are removed. Each of the ends 8 and 9 and the walls 12 and 13 are provided with two slots or notches 19 and 20, the slots being alined in two series, and notches 21 and 22 are similarly formed in the sides 6 and 7 and the walls 14 and 15, the purpose of which will presently appear.

The table is surmounted by three hoppers or reservoirs for the rack elements, the forms being passed successively beneath said hoppers and act to withdraw the exact number of blanks therefrom. The mechanism for moving the forms beneath the hopper, to and beneath the hammer which forces the blanks into locking relation, and to the kicker or ejecting mechanism, will be hereinafter set forth.

The hoppers are alike in form and a description of one will therefore suffice. The hoppers, see Fig. 1, are designated generally by A, B and C, the first supplying the lower series of slats 2, the second, or B, supplying the cross partitions 1, and the third, C, supplying the second series of slats 3.

Secured to and extending upwardly from the bed 4, see Figs. 2, 13, 14, 15 and 16, are two supporting posts or columns 23 and 24, to which are secured two vertically spaced cross bars 25 and 26. Said bars are slotted as at 27, Fig. 16, and to each bar is adjustably secured a pair of horizontally disposed arms 28, said arms forming the supports for a pair of vertically disposed upper walls 29 and 30. Each wall is provided on its inner face adjacent its forward edge with a fixed guide strip 31, while adjacent the rear edge is an adjustable guide 32, said guides engaging the blanks at their ends. Extending forwardly from each of the cross bars 25 and 26, and adjustably secured thereto are four brackets 33, said brackets being arranged in pairs and each pair being connected by a cross bar 34. The upstanding end of each bracket is slotted and machine screws 35 pass freely therethrough and into vertically disposed plates 36, of which there are two, said plates at their lower ends being each provided with a supporting finger or ledge 37 upon which the stacked blanks normally rest. Spring retracted gates 38 stand in front of the lower portion of the blanks at each end thereof so that the lowermost blank alone may be withdrawn at a time.

Pivotally supported on the ends of a cross-bar or shaft 39 carried by bearings 40 attached to the lower cross bar 34, see Fig. 14, are two lifting levers 41, said levers being slightly curved. The forms as they are moved over the table are guided in tracks or ways 42 so that they are brought into proper relation to the hoppers, the notches 19 and 20 or 21 and 22, as the case may be, alining with the fingers 37, so that the form may pass without interference therewith. The lifting levers 41, however, contact the wall (or side) of the form and are swung upwardly thereby coming into contact with the blanks and lifting them clear of the form. This position is maintained until the levers clear the partitions at which time the first cleat 16 will have passed free of the hopper and the second cleat will engage the lowermost blank in the then lowered stack of blanks and remove the same from the fingers 37. As such blank leaves the fingers it will contact the inclined face 17 and slide edgewise down into the channel or way 18. Such operation continues until each channel has a blank deposited therein. As the wall 13 approaches the hopper it will contact the lifting levers and rock them upwardly into contact with the lower-most blank, thereby lifting the blanks and permitting the form to pass from beneath the hopper to the next loading or operating station.

It will, of course, be understood, that the form is moved first in one direction or line and then, as it passes beneath the next hopper, at right angles to the line of its former line of movement, in which case the side 6 becomes the forward advancing element which coöperates with the lifting levers followed, after the blanks have been introduced, by the wall 15 which again elevates the lifting levers.

The forms are passed successively beneath the hoppers A, B and C, and the slats 2 and 3 and the cross partitions 1, occupy the relative positions illustrated in Fig. 19 with the grooves 43 in the slats in line with the notches 44 in the edges of the cross partitions. The forms are then moved beneath a drop hammer which is automatically operated and descends with sufficient momentum, owing to its weight, to drive the rack elements together. Such mechanism is best shown in Figs. 1, 2 and 11. Extending upwardly to a point considerably above the bed or table are two columns 45 and 46 connected at their upper ends by a cross bar 47 having an opening therein forming a guide for the upper portion of a rod or stem 48. To the lower end of the stem there is secured a cross head or frame 49 which engages slides 50 secured upon the columns 45 and 46. Said cross head has secured to its lower face a weighted hammer 51 the lower face whereof is smooth and of such dimensions that it may readily pass into the form and drive the slats and partitions into interlocking relation. The hammer is automatically raised and released and is allowed to fall under the action of gravity. Stem 48 carries a roller 52 and a cam 53 coöperates therewith. Said cam is loosely mounted on a shaft 54, the shaft having secured thereto a toothed clutch element 55 adapted to coöperate with a locking dog or lever 56 fulcrumed at 57 to the cam. A spring 58 connected to the cam, and to the outer end of the lever, tends to draw the lever into locking relation with the clutch element 55 and when such engagement is effected the cam rotates with the shaft. The shaft carries a sprocket wheel and is constantly driven in a manner later set forth. The cam also carries a stop 59 which lies above the lever 56, and a trip lever 60, fulcrumed upon a cross bar 61, has its upper end so arranged that it will pass beneath the clutch lever 56 and hold the same out of engagement with the clutch element 55, a spring 62 serving to throw the upper end of lever 60 inwardly. Said lever passes through a slotted guide 63 and its lower end stands in line with the end wall 8 of the form which has just passed from beneath the hammer and engages the notch 20 therein. Such form is shown at the extreme left in Fig. 11 and, as it is moved forward, by means presently set forth, it swings lever 60 allowing the dog 56 to engage clutch element 55 thereby locking the cam to the shaft 54 and withdrawing the same from beneath the roller 52. The weighted hammer 51 then drops within the form and drives the crate elements together. The cam continues to rotate and by reason of its shape will contact roller 52 and again elevate the stem 48, cross head 49 and hammer 51. The lower end of trip lever 60 will, before the hammer is fully elevated, be freed from the notch in the form by reason of the outward movement of the form, and spring 62 will bring it to such position that it will stand in the path of movement of the clutch lever 56 and contact the same. Such contact will raise said lever 56 out of engagement with the clutch element 55 and the cam will come to rest with the hammer held in an elevated position thereby. The form advancing mechanism will then move the form from beneath the hammer and carry it to the position to the extreme left, Fig. 11, where it comes to rest for a period of time. When in such position it overlies the kicker or rack ejecting mechanism. Said mechanism, see Figs. 1 and 11, may be said to comprise four vertically disposed pins 64 secured at their lower ends to a frame or cross head 65 mounted for vertical reciprocation in a guideway 66. The pins at their upper ends are guided in openings formed in plates 67 and are so spaced that, when elevated by a cam 68 contacting a roller 69 carried by the frame 65, they pass up through the openings 11 in the bottom 10 of the form and strike against the assembled rack. As the pins move upwardly the assembled rack is raised out of or into the upper portion of the form and an attendant lifts such rack to one side.

Ordinarily nine forms are employed in connection with the machine and are moved automatically over the bed and beneath the various hoppers, beneath the hammer, and over the kicker pins, by suitable advancing means as endless chains having engaging cleats or lugs thereon. A single source of power is preferably employed, as, for instance, an electric motor 70 (Fig. 3) to drive the advancing chains, said motor through suitable connections also actuating the hammer elevating cam and the kicker operating cam 68. Said motor through a belt 71 drives a shaft 72 which in addition to the pulley 73 about which the belt passes, carries a smaller pulley 74. A belt 75 passes about said pulley 74 and about a larger pulley 76 secured to one end of a shaft 77. Said shaft at its inner end carries a sprocket wheel about which passes a sprocket chain 78, the chain in turn passing about a sprocket wheel secured to a shaft 79 upon which the kicker cam 68 is secured. Shaft 77 also has secured to it a second sprocket 80, Fig. 4, which drives a sprocket chain 81, said chain passing over an idler sprocket 82, about a large sprocket 83 and about a sprocket 84 secured upon shaft 54 which carries the clutch member that actuates the hammer lifting cam. Sprocket 83 is secured to a shaft 85 and a gear 86 is also secured to said shaft, said gear meshing with a gear 87 secured to a shaft 88. Said shaft 88 through various other intergeared shafts and sprocket drives, all of which are perfectly clear upon reference to Figs. 3 and 5 to 10 inclusive, imparts motion to the various feed chains which traverse the forms over the table, and a detailed description thereof is not deemed essential. The various chain runs which are provided with lugs or cleats as 89 to engage the forms, may, however, be designated generally by $a, b, c, d, e,$ and $f$, the forms being automatically transferred by one to the other, and traversed over the table along the rails 42. As will be noted, run $d$ stands at right angles to $c$ and $e$ so that in effect the forms are given a quarter turn in order that the cross partitions 1 will be dropped in the form at right angles to the previously inserted lowermost series of slats. The parts are so timed that a proper sequence of operations obtains.

What is claimed is:

1. In a rack assembling machine, the combination of a plurality of hoppers adapted to hold the separate component rack elements; a form having means therein to receive the elements and to properly space and position the same; means for successively moving the form beneath the hoppers; and an automatically operated hammer for forcing the rack elements into locking relation.

2. In a rack assembling machine, the combination of a plurality of hoppers adapted to hold the separate component rack elements; a form having means therein to receive the elements and to properly space and position the same; means for successively moving the form beneath the hoppers; an automatically operated hammer for forcing the rack elements into locking relation; and means for ejecting the assembled rack from the form.

3. In a rack assembling machine, the combination of a table; a plurality of hoppers arranged above the same adapted to hold the separate component rack elements; a form provided with means for withdrawing the rack elements one by one and holding them in spaced relation; a hammer; means for moving said form over the table, beneath the hoppers and to the hammer; and means for operating the hammer.

4. In a rack assembling machine, the combination of a table; a plurality of hoppers arranged above the same adapted to hold the separate component rack elements; a form provided with means for withdrawing the rack elements one by one and holding them in spaced relation; a hammer; means for moving said form over the table, beneath the hoppers and to the hammer; means for ejecting the assembled rack from the form; and means for operating the hammer and said ejecting means.

5. In a rack assembling machine, the combination of a table; a plurality of hoppers arranged above the table adapted to hold the separate component rack elements; a form provided with means for withdrawing the rack elements one by one and holding them in spaced relation; a hammer; means for moving said form over the table beneath the hoppers and to a point below the hammer; means for ejecting the assembled rack from the form; means for operating said ejecting means; and means controlled by the form for bringing the hammer into operation.

6. In a rack assembling machine, the combination of a plurality of hoppers adapted to hold the separate component rack elements; a form having a plurality of spaced cleats therein forming guideways for the reception of the rack elements, said cleats being adapted, as the form is passed beneath the hopper, to remove the lowermost rack element contained within the hopper and thereby position within the form the requisite number of rack elements; and means for traversing said form.

7. In a rack assembling machine, the combination of a table; a plurality of hoppers located above the same and adapted to hold the various component rack elements; a form, said form having a series of vertically disposed spaced cleats arranged therein with the upper ends of the cleats rounded whereby channels or grooves are formed for the reception of the rack elements; means associated with each hopper adapted to contact the form as it is moved beneath the same to lift the rack elements in the hopper as the advancing and rear walls of the form pass in line with the hopper whereby the rack elements are held out of contact with such walls, said means being out of line with the cleats so that the rack elements may drop down and be in line with the cleats in order that the cleats may contact the elements and remove the same piece by piece; and means for traversing the forms beneath the hoppers.

8. In a rack assembling machine, the combination of a table; a plurality of hoppers arranged above the same and adapted to hold the separate component rack elements; a pair of levers pivoted below each hopper; a form adapted to receive the rack elements and hold them in spaced relation therein; and means for traversing the form beneath the hoppers, the advancing and rear walls of the form contacting the levers and throwing the same upwardly into contact with the rack elements in the hopper and thereby lifting the same so that the wall may pass free of the elements, said levers dropping down as the front wall passes from beneath the same whereby the elements are brought into operative relation with the means contained within the form for holding the elements in proper position.

9. In a rack assembling machine, the combination of a table; a plurality of hoppers arranged above the same adapted to hold the separate component rack elements, a form provided with means for withdrawing the rack elements one by one and holding them in spaced relation, said form having openings provided in the bottom thereof; a hammer adapted to force the assembled rack elements into interlocking engagement; and an ejecting mechanism underlying the path of movement of the form beyond the hammer and adapted to be projected upwardly through the openings in the form and to contact the assembled rack and move the same upwardly within the form.

10. In a rack assembling machine, the combination of a table; a plurality of hoppers arranged above the same adapted to hold the separate component rack elements; a form provided with means for withdrawing the rack elements one by one and holding them in spaced relation, said form having openings provided in the bottom thereof; a hammer; a frame; a plurality of vertically disposed pins carried by the frame;

means for operating the hammer to force the rack elements placed within the form into interlocking relation; and means for operating the frame carrying the pins and moving them upwardly through the openings in the form into contact with the assembled rack for removing such rack from the form.

11. In a rack assembling machine, the combination of a table; a series of hoppers arranged above the same adapted to hold the separate component rack elements; a plurality of forms, each of said forms being provided with means for withdrawing the rack elements one by one and holding them in spaced relation; means for moving the forms along the table and beneath the hoppers, said means moving the form in one direction beneath the first hopper, thence at right angles thereto beneath the second hopper, thence beneath the third hopper in a direction the same as that which obtained under the first hopper; and a hammer adapted to force the rack elements into interlocking relation.

12. In a rack assembling machine, the combination of a table; a series of hoppers arranged above the same adapted to hold the separate component rack elements; a plurality of forms, each of said forms being provided with means for withdrawing the rack elements one by one and holding them in spaced relation; means for moving the forms along the table and beneath the hoppers, said means moving the form in one direction beneath the first hopper, thence at right angles thereto beneath the second hopper, thence beneath the third hopper in a direction the same as that which obtained under the first hopper; a hammer adapted to force the rack elements into interlocking relation; and means for ejecting the assembled rack.

13. In a rack assembling machine, the combination of a table; three hoppers arranged above the same adapted to hold the component rack elements, the intermediate hopper being arranged at right angles to the first and third hoppers which stand in parallelism; a plurality of forms each being provided with means for withdrawing the rack elements one by one and holding them in spaced relation therein; means for traversing the forms successively beneath the hoppers, the form passing beneath the first and third hoppers in the same direction and at right angles to said direction beneath the intermediate hopper; and a hammer adapted to force the rack elements into locking engagement.

14. In a rack assembling machine, the combination of a table; three hoppers arranged above the same adapted to hold the component rack elements, the intermediate hopper being arranged at right angles to the first and third hoppers which stand in parallelism; a plurality of forms each being provided with means for withdrawing the rack elements one by one and holding them in spaced relation therein; means for traversing the forms successively beneath the hoppers, the form passing beneath the first and third hoppers in the same direction and at right angles to said direction beneath the intermediate hopper; a hammer adapted to force the rack elements into locking engagement; and means for ejecting the assembled racks from the forms after they pass the hammer.

15. In a rack assembling machine, the combination of a table, a plurality of hoppers arranged above the same adapted to hold the separate component rack elements, each hopper embodying a pair of spaced fingers at the lower portion thereof adapted to contact the lowermost rack element in the hopper and to hold the same; a form substantially rectangular in outline and provided with a pair of notches in each of the upper edges thereof, said notches being spaced apart a distance equal to the space between the fingers aforesaid; means contained within the form for withdrawing the rack elements from the hoppers as they pass beneath the same and hold such elements in spaced relation within the form; a hammer adapted to force the assembled rack elements into locking relation; means for moving the forms beneath the hoppers and the hammer; a cam for elevating said hammer; a constantly rotating clutch member associated with said cam; a locking lever carried by the cam and adapted when released to engage the clutch member; a lever serving normally to hold the locking lever out of operative relation with the clutch member, said lever extending downwardly into the path of movement of the forms and standing in alinement with one of the notches aforesaid, whereby when the form is moved the lever will be actuated by contacting with the wall of the notch and be withdrawn from holding position with reference to the locking lever thereby bringing the clutch into operative relation with the cam causing the same to move and elevate the hammer.

In testimony whereof I have signed my name to this specification.

OSCAR SLIGER.